United States Patent [19]
Cowan et al.

[11] Patent Number: 5,379,840
[45] Date of Patent: Jan. 10, 1995

[54] HIGH TEMPERATURE WELL CEMENTING WITH LOW GRADE BLAST FURNACE SLAG

[75] Inventors: Kenneth M. Cowan, Sugar Land; Arthur H. Hale, Houston, both of Tex.

[73] Assignee: Shell Oil Company, Houston, Tex.

[21] Appl. No.: 109,289

[22] Filed: Aug. 19, 1993

[51] Int. Cl.6 .................. E21B 21/00; E21B 33/14
[52] U.S. Cl. .................. 166/292; 106/789; 175/65
[58] Field of Search ........... 166/292, 293; 175/65; 106/789, 790, 791; 507/140

[56] References Cited

U.S. PATENT DOCUMENTS

| | | |
|---|---|---|
| 2,822,873 | 2/1958 | Harmsen et al. |
| 3,499,491 | 3/1970 | Wyant et al. |
| 3,557,876 | 1/1971 | Tragesser |
| 4,174,974 | 11/1979 | Fondriest |
| 4,756,761 | 7/1988 | Philip et al. |
| 4,897,119 | 1/1990 | Clarke |
| 5,016,711 | 5/1991 | Cowan |
| 5,020,598 | 6/1991 | Cowan et al. |
| 5,058,679 | 11/1991 | Hale et al. |
| 5,091,349 | 2/1992 | Alpert et al. |
| 5,106,423 | 4/1992 | Clarke ........... 106/789 |

OTHER PUBLICATIONS

"Conversion of Drilling Fluids to Cements with Blast Furnace Slag-Performance Properties and Applications for Well Cementing", SPE Paper 24, 575, Cowen et al., Oct. 4, 1992.

Javanmardi et al., "Mud to Cement Technology Proven in Offshore Drilling Project", *Oil and Gas Journal*, Feb. 15, 1993, pp. 49–57.

Primary Examiner—George A. Suchfield

[57] ABSTRACT

Drilling fluid is solidified by the incorporation therein of low grade blast furnace slag. In a preferred embodiment lime is also incorporated into said drilling fluid and/or said drilling fluid is a lime drilling fluid. Thus, there is provided a cementitious composition comprising drilling fluid, low grade blast furnace slag and, generally, lime. Also provided is a drilling and cementing process wherein a cementitious slurry comprising low grade blast furnace slag is introduced into a wellbore to cement a casing or liner.

3 Claims, 1 Drawing Sheet

HIGH TEMPERATURE WELL CEMENTING WITH LOW GRADE BLAST FURNACE SLAG

BACKGROUND OF THE INVENTION

This invention relates to well cementing.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, a conduit (casing) must be inserted into the borehole extending from the surface downward, and liners may be hung inside the casing.

At this point it becomes necessary to dispose of the used drilling fluid and to fill the annulus between the casing and the borehole wall or between the liner and casing with a material which will seal the annulus (interfacial sealing) to inhibit communication between various formations penetrated by the wellbore and which will provide structural support for the casing or liner. This is commonly referred to as primary cementing.

Bonding of the cement to the casing and borehole surfaces is critical to providing an effective seal in the annulus and for providing support for casings. However, bonding or interfacial sealing between the cement and borehole surfaces is not readily achievable. Generally, the borehole into which the casing or liner is introduced is filled with drilling mud. Conventional Portland cement and conventional drilling muds are incompatible. Thus, a mixture of conventional Portland cement and conventional drilling mud will not set up into a strong cement. In addition, the viscosity of such mixtures becomes uncontrollable and may either become too viscous to pump or may get thinner.

At the completion of drilling, the used drilling fluid is displaced from the borehole using some means to keep it separate from the cement to follow. This creates two problems. First, the means developed by the industry to keep the drilling fluid separate is relatively complex, involving the use of a landing collar and a pair of wiper plugs. In addition, the thus-displaced drilling fluid must be disposed of. Wyant et al, U.S. Pat. No. 3,499,491 (Mar. 10, 1970) proposed a partial solution to this problem by mixing a cementitious material such as Portland cement with powdered sodium silicate glass and a treated drilling fluid. While this does solve the problem of drilling fluid disposal since the drilling fluid is incorporated into the cement, it necessitates the use of extraneous components in order to achieve a sufficient degree of compatibility to make the cement work at all.

Over the years there has been a tendency for wells to be drilled to greater depths and in exotic locations as the supply of easily obtained oil is diminished. This has resulted in the necessity to drill and cement under conditions of greatly elevated temperatures. Portland cement is particularly sensitive to temperature variations and thus conventional cementing of high temperature wells poses a significant problem to the industry.

Hale and Cowan, U.S. Pat. No. 5,058,679 (Oct. 22, 1991) disclose solidifying drilling fluid by admixing blast furnace slag with the drilling fluid. Tragesser, U.S. Pat. No. 3,557,876 (Jan, 26, 1971) refers to drilling fluids containing pozzolans although no working examples are given.

It would be desirable to have a low cost cementitious material which could be solidified over a wide range of temperature including the very high temperatures now encountered in many drilling operations and which woould give good interfacial sealing.

SUMMARY OF THE INVENTION

It is an object of this invention to provide a cementitious composition from drilling fluid which is operable over a wide range of temperature including temperatures above 250° F. where Portland cement strength regression begins;

It is yet a further object of this invention to provide a cementitious material from drilling fluid which is operable even up to the 450° F. and higher temperatures encountered in some deep well formations;

It is yet a further object of this invention to achieve good interfacial sealing in wellbore cementing;

It is yet a further object of this invention to provide a method to solidify drilling fluids; and It is yet a further object of this invention to provide a low cost cementitious composition which is operable at elevated temperatures.

In accordance with this invention a cementitious slurry is produced by combining drilling fluid and blast furnace slag having a slag activity index of less than 100.

In accordance with another embodiment of this invention, blast furnace slag having a slag activity index of less than 100 is combined with water to produce a cementitious slurry which is utilized in a borehole having a static temperature within the range of about 150° F. to 750° F.

DETAILED DESCRIPTION OF THE INVENTION

Figure 1:
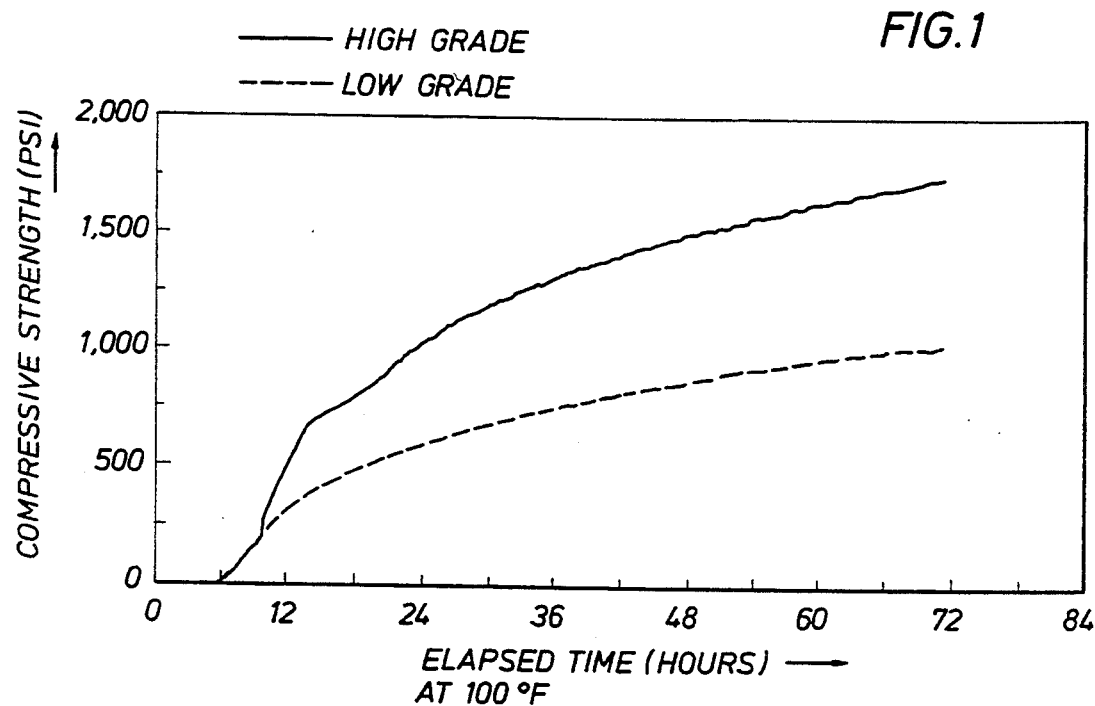

It has been found that low grade blast furnace slag can be used to produce a cementitious slurry which can be solidified over a wide range of temperatures including high temperatures where strength regression occurs with Portland cement. Such cementitious slurries can be produced by combining low grade blast furnace slag with water, drilling fluid or universal drilling fluid. There are also economic advantages to low grade blast furnace slag as compared to high grade blast furnace slag in high temperature applications since the raw material is less expensive plus it has less need for retarders. Yet it can give comparable or superior ultimate strengths.

Definitions

By "low grade blast furnace slag" is meant blast furnace slag having a 28-day slag activity index at 73° F. plus or minus 3° F. and ambient pressure as defined in ASTM C 989-89 of less than 100, generally 50 to 99, more preferably 70 to 90. Suitable low grade blast furnace slags include grade 100, and more preferably, grade 80.

By "cementitious slurry" is meant, unless otherwise specified, a slurry comprising low grade blast furnace slag and water.

By "high temperature" is meant a static temperature of greater than 125° F., generally 150° F. to 750° F. more generally 150° F. to 250° F. Generally the high temperature will include a temperature of from greater than 250° F. to 700° F. In many utilities, the temperature will include a temperature of 150° to 250° F. Generally, the highest temperature encountered will be the bottom hole static temperature (BHST) although it is possible to encounter a higher temperature at an intermediate depth.

By "lime" is meant either commercial lime, calcium oxide or calcium hydroxide.

By "activator system" or "secondary activator" is meant an optional component in addition to the lime, if any, and may either be a single activator or a mixture of activators.

By "direct fluid contact" between a displacement fluid and the cementitious slurry is meant that the displacement fluid directly contacts the upper surface of a column of cementitious slurry as opposed to having a solid wiper plug and/or spacer fluid disposed between the cementitious slurry and the displacement fluid. By "direct fluid contact" between the cementitious slurry and the drilling fluid or mud is meant that the cementitious slurry directly contacts the upper surface of a column of drilling fluid or mud as opposed to having a wiper plug and/or spacer fluid with a rupturable diaphragm disposed between the cementitious slurry and the drilling fluid or mud.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

As used herein "down" or "in" as it relates to a drill string or casing means in a direction toward the farthest reach of the borehole even though in some instances the borehole can be disposed in a horizontal position. Similarly, "up" or "out" means back toward the beginning of the borehole.

The term "universal fluid" means a low grade blast furnace slag-containing composition suitable for drilling.

By "barrel" is meant a standard 42-gallon petroleum barrel.

Temperature

In addition to compatibility with drilling fluid, two main advantages of this invention are (1) the ability to cement over a wide range of temperatures with a single cementitious slurry formation and (2) the ability to provide a strong cement even at temperatures well in excess of the temperature where strength regression occurs with Portland cement.

Further as to (1) wells with temperature gradients in the portion of the borehole being cemented in the range of 100° F. to 500° F. or more can be cemented with a single formulation. That is, with a single formulation, a temperature for instance of from 100° F. to 200° F., (i.e., a 100° gradient) or even a temperature of 100° F. to 600° F. (a 500° gradient) can be cemented, although the maximum gradient for a single formulation will generally be no more than 150° F. In accordance with the invention at least part of the cementitious slurry is exposed to high temperatures as defined herein. A part of the slurry, however, may be placed at temperatures below the high temperature range, for instance at temperatures of 30 to 124, more generally 40° to 124° F. Thus, with variations in retarder and/or activator systems a well traversing temperatures of from 30° F. to 750° F. can be cemented. If desired, however, high grade blast furnace slag (grade 120 for instance) can be used for temperatures of 30°-250° F. in conjunction with low grade blast furnace slag at higher temperatures, i.e. from greater than 250° F. to 750° F., since the two are compatible. Also, since blast furnace slag slurries, whether high or low grade, are compatible with Portland cement, Portland cement can be used for the portion of the wellbore which exhibits a static temperature where Portland cement is not adversely affected, say for instance, 60° to 90° F.

Cementitious Slurry Preparation

The cementitious slurry can be prepared from water, drilling fluid (since blast furnace slag is compatible with drilling fluid) or a universal fluid. The cementitious slurry generally contains 20–600, preferably 100–500, more preferably 100–350 lbs of low grade blast furnace slag per barrel of cementitious slurry.

Drilling Fluid

The drilling fluids which can be used to make the cementitious slurries of this invention include both aqueous drilling fluids and high water content invert emulsions. By "aqueous drilling fluids" is meant any fluid having water as the continuous phase including oil-in-water emulsions as well as oil-free water-based drilling fluids. By "high water content invert emulsions" is meant any drilling fluid having oil as the continuous phase with a relatively high content of water such as relaxed filtrate oil mud invert emulsions which have about 60:40 volume ratio of oil to water.

Many aqueous drilling fluids use a salt solution such as sea water and such drilling fluids can be solidified in accordance with this invention.

Exemplary muds include sea water/lignosulfonate, seawater/gypsum, fresh water/partially hydrolyzed polyacrylamide (PHPA) and sodium chloride/partially hydrolyzed polyacrylamide muds.

The drilling fluids will naturally have drill solids contained therein including clay. Generally, the initial drilling fluid has clay such as prehydrolyzed bentonite in addition to any clay encountered during the drilling operation, although essentially clay-free systems, except for any clay encountered during drilling, can also be used.

Generally, the drilling fluid will contain conventional fluid loss additives, for instance, synthetic polymers such as biopolymers, starch, polyalcohols, and carboxymethyl cellulose. In addition, the clay which is generally present in an amount within the range of 2 to 50, more commonly 5 to 30, still more commonly 10 to 20 lbs/bbl of drilling fluid serves as a fluid loss additive. While the invention is equally applicable to drilling fluids not containing such materials, when they are present, their function generally carries over to the cementitious slurry and provides a valuable ingredient for the cementitious slurry.

Similarly, if shale stabilization is a problem during drilling, the drilling fluid likely will contain a shale stabilizer. The polyalcohols, if present, also serve as shale stabilizers. Other shale stabilizers include alkali metal silicates such as sodium silicate and sodium chloride, if it is present.

The applicable drilling fluids may also contain weight materials such as barite (barium sulfate). Additional weight material is not likely to be necessary since the blast furnace slag itself provides weight, but if desired, additional weighting material can be added. Alternatively, the drilling fluid may be diluted prior to incorporation of the blast furnace slag if a lower density cementitious slurry is desired.

Drilling fluids frequently also contain deflocculants such as carbohydrate polymers which, if present, are generally present in the range of 0.5 to 10 lbs/bbl of drilling fluid.

The drilling fluid may also contain rheology control agents which are generally designed to increase the viscosity so as to enable the drill solids to be carried out of the well. In any event, the biopolymers and silicates referred to hereinabove also provide viscosity if they are present. Whether or not such viscosifying agents are present in the drilling fluid, the viscosity of the cementitious slurry can be adjusted by the addition of appropriate rheology control agents which generally constitute thinners as discussed hereinbelow since it is generally desirable to affirmatively thin or disperse the cementitious slurry.

In instances where the cementitious slurry is not made from drilling fluid, the appropriate salts, fluid loss additives, shale stabilizers, weight materials, and deflocculants, for instance, of the type just described, can be combined as needed with the cementitious slurry.

Low Grade Blast Furnace Slag

The low grade blast furnace slags are quenched slags, preferably partially water quenched (sometimes called quick water quenched) as opposed to air quenched (sometimes called pelletized). The fully water quenched slags are granular. The low grade slags useful in this invention may be pelletized or granular. Low grade blast furnace slags are available from Standard Slag Industries, Fruitland, Ontario, Canada LOR1LO, and from Blue Circle Cement Company.

Preferably, the low grade blast furnace slag used in this invention has a particle size such that it exhibits a Blaine specific surface area between 2,000 cm$^2$/g and 15,000 cm$^2$/g and more preferably, between 3,000 cm$^2$/g and 15,000 cm$^2$/g, even more preferably between 4,000 cm$^2$/g and 9,000 cm$^2$/g, most preferably between 4,000 cm$^2$/g and 8,500 cm$^2$/g.

Activation

In its simplest form, activation may occur simply through an increase in temperature and/or the effect of residual silicate, if silicate-containing drilling fluid is used to prepare the cementitious slurry.

In some instances, however, a divalent activator component and/or a secondary activator system will be included in the cementitious slurry to speed up the setting time. The divalent metal component is preferably lime, either commercial lime, calcium oxide or calcium hydroxide which forms as a result of the contact of lime with water or moisture.

The lime, if used, is generally used in an amount within the range of 5 to 100, preferably 10 to 50, more preferably 10 to 40 lbs/bbl of total drilling fluid. By "lbs/bbl" is meant lbs of CaO and/or the amount of CaO required to produce any Ca(OH)$_2$ added.

Other suitable divalent components include divalent metals whose salts are soluble in water or at least not totally insoluble, such as calcium sulfate and calcium halides such as calcium chloride. Also applicable are aluminates such as calcium aluminate. Also applicable are magnesium chloride, magnesium sulfate and cesium formate.

Secondary activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, sodium bicarbonate, titanium carbonate, potassium carbonate, potassium bicarbonate, sodium hydroxide, potassium hydroxide, potassium sulfate, potassium nitrite, potassium nitrate, sodium or potassium aluminate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate), for instance, can be used as the secondary activator, alone or in combination with calcium oxide. When mixtures of alkaline agents such as caustic soda and soda ash are used the ratio can vary rather widely since each will function alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. Generally, if used at all, 2 to 70 lbs/bbl of secondary activator is used.

Retarders

Retarders, when used, are generally used in an amount within the range of 0.1 to 30, preferably 5 to 25 volume percent based on the weight of the continuous (fluid) phase of the drilling fluid.

Organic compounds in general and more specifically, low molecular weight organic acids, are suitable retarders. Lignosulfonates, including both chrome lignosulfonate and chrome-free lignosulfonate, can serve as retarders.

Retarders are generally compounds which have OH, COOH, BO$_3$ or BO$_4$ functional groups which are a part of or can be released from the compound in solution. Chelating agents are also retarding agents. Such agents include lignosulfonates, citric acid, EDTA, and borax. Other retarding materials include phosphonates, such as those used in scale inhibition in oil and gas wells and also in water treatment processes for boilers, cooling towers, etc. Examples of such materials are those marketed by Monsanto Company under the trade name "DEQUEST". Specific examples are "DEQUEST" 2000, 2006, 2010, 2016, 2060, and 2066.

Other retarding materials include some phosphates such as sodium, potassium, calcium or magnesium glycerophosphates, borates such as boric acid and its salts, salts of organic acids such as sodium or potassium gluconate, sodium or potassium glucoheponate and sodium citrate. Organic amines can also be retarders.

Combinations of borax, boric acid or other borate salts and some borate ester surfactants such as monothanolamine borate with lignosulfonate or organic acid salts are good retarders, especially for the upper portions of the high temperature encountered. These are commonly used as high temperature retarders for cements. Salts of organic polyacids such as EDTA, polyacrylic acid, polymethacrylic acid, itaconic acid, fumaric acid can also retard in some temperature ranges.

Polyalcohols represent another class of very effective retarders.

Thinners

Generally, it is desired to thin or disperse the cementitious slurry so as to make it more pumpable. Chromium lignosulfonate may be used as a thinner although since it also functions as a retarder it is generally not preferred.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, sulfomethylated tree extract, stearyl amine and lauryl amine surfactants, sulfonated styrene-toluene copolymers, and mixtures thereof.

Polyalcohols

If desired, a polyalcohol can be utilized to improve the bonding of the cement. Suitable polyalcohols are disclosed in Cowan and Hale, U.S. Pat. No. 5,020,598 (Jun. 4, 1991) and said Cowan and Hale patent, U.S. Pat. No. 5,058,679, the disclosures of which are hereby incorporated by reference.

If a polyalcohol is used, it may be desirable in some instances to use one modified with an epoxy resin.

The epoxy resin can be used in an amount sufficient to give 0.5 to 5 wt % material from the epoxy resin incorporated in the epoxy polyethercyclicpolyol. Alternatively, a relatively high epoxy content can be utilized, say 6 to 75, preferably 20 to 45 wt %. Thus, viewed in terms of the polyol, the epoxy component content can vary from 0 to 67 wt % based on the total weight of the polyol.

The initial pressure can be higher when making the higher epoxy material as compared with the initial pressure preferred for the low epoxy. For instance, the initial pressure can be greater than 180 torr. Generally, the initial pressure will be between 250 and 500, preferably 250–350 torr, i.e., a vacuum, when the starting polyhydric alcohol component is glycerine. If desired, the reaction can be terminated before 1.1 moles of water are removed per mole of polyol reactant. Preferably, the polyhydric alcohol monomer is introduced into the reaction zone in a single addition and the epoxy introduced in a plurality of additions, preferably 2 to 10, most preferably 3 to 6 when utilizing the higher epoxy. Generally, if higher epoxy content materials are being produced, more additions are utilized and the addition of the epoxy could be continuous. With the high epoxy content materials diglycidyl ethers are preferred instead of the tri- and tetraglycidyl ethers.

Another class of polyalcohols is ethoxylated propoxylated alcohols of the following general formula

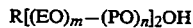

$R[(EO)_m-(PO)_n]_2OH$ where EO = an ethoxy unit
PO = a propoxy unit
R = an alkyl chain of 2–16 carbon atoms, preferably 3–16, most preferably 4–10 carbon atoms. At least one of m or n is greater than 0. In these EO/PO copolymers, m and n are variable and the sum of m plus n determines their number average molecular weight, which ranges from 500 to 15,000, preferably from 600 to 10,000.

The concentration of the polyalcohol, if used, can be from 1–50, preferably 3–30, more preferably 5–25 volume percent based on the volume of the water phase of the drilling fluid.

Filter Cake Setting

In yet another embodiment of this invention the drilling process is carried out with a universal fluid to produce the borehole through a plurality of strata thus laying down a filter cake comprising low grade blast furnace slag. Prior to the cementing operation, an activator can be passed into contact with the filter cake, for instance by displacing out the drilling fluid and circulating a fluid containing the activator down the drill string and up the annulus between the drill string and the filter cake, or else the drill string is removed and the casing inserted and the activator circulated down the casing and up the annulus (or down the annulus and up the drill string or casing). Preferably, the circulation is carried out by using the drill string, this being one benefit of this embodiment of the invention whereby the filter cake can be "set" to shut off gas zones, water loss, or to shut off lost circulation in order to keep drilling without having to remove the drill string and set another string of casing. After the drilling is complete, the drill string is removed, and the cementing carried out.

Conventional spacers may be used in the above described sequence. Also, any leftover fluid having activators therein may be displaced out of the borehole by the next fluid and/or a spacer fluid and stored for subsequent use or disposal.

In this embodiment where the filter cake is "set", the activator can be lime and/or any of the alkaline activators referred to hereinabove such as a mixture of sodium hydroxide and sodium carbonate. Alternatively, no activator is required since the blast furnace slag will eventually set through the action of the heat and/or any activators in the cementitious slurry when it is introduced.

Ingredient Ratios

Low grade blast furnace slag can be present in the drilling fluid in an amount within the range of about 1 to about 100 lbs/bbl of final drilling fluid, preferably 20 to 50 lbs/bbl to give a universal fluid. Additional low grade blast furnace slag can be added between the drilling operation and the cementing operation to give a total concentration of low grade blast furnace slag in the cementitious slurry within the range of from about 20 to 600 lbs/bbl, preferably 100 to 500 lbs/bbl, most preferably 150 to 350 lbs/bbl.

A silicate, if present, is generally present in an amount within the range of 1 to 100, preferably 2 to 15, most preferably 5 to 10 lbs/bbl based on barrels of drilling fluid.

The concentration of the polyalcohol, if used, in the water phase of the drilling fluid of this invention will generally be 1–50% by volume and preferably from about 3 to 30% by volume based on the volume of water, more preferably from 5 to 25% by volume, most preferably between 10 and 20% by volume. The soluble:insoluble polyols can be used in weight ratios of about 0.1:1 to 10:1, preferably 0.25:1 to 2:1, more preferably 0.5:1 to 1:1 soluble:insoluble.

Dilution

Another feature of this invention where a drilling fluid is used to form the cementitious slurry, is the ability to tailor the rheology of both the drilling fluid and the final cement to the conditions of a particular wellbore. This results in part from the fact that the use of slag as the hydraulic material gives a final cementitious slurry which is not weakened in the manner that would be the case with Portland cement if the slurry is more dilute. On the other hand, additional slag does not impart extremely high viscosity to the slurry and thus a higher concentration of hydraulic materials can be used if desired.

However, in the preferred method of this invention, the drilling fluid is utilized and thereafter diluted prior to or during the addition of additional blast furnace slag. The dilution fluid can be the same as the liquid used to make the drilling fluid or it can be different. Generally, it will be brine, especially if the drilling fluid was made using brine. It can also be a more concentrated brine. In many instances, it is preferred that both the dilution fluid and the original liquid used to produce the initial drilling fluid be seawater. This is especially beneficial in offshore drilling applications where fresh water is not readily available and seawater is.

Thus, a significant improvement in the operating procedure is provided. This is because the density of the drilling fluid can be chosen in the first place to be sufficient to avoid inflow into the wellbore because of formation pressure but insufficient to rupture the wellbore wall and force fluid out into the formation. By utilizing the dilution and thereafter the addition of additional blast furnace slag, the cementitious slurry can also have the density tailored to the particular operation the same as the drilling fluid.

The dilution can be carried out in either of two ways. First, a vessel containing drilling fluid can be simply be isolated and the desired amount of water or other diluent added thereto. In a preferred embodiment, however, the drilling fluid is passed to a mixing zone as a flowing stream and the diluent added to the flowing stream. Thereafter, the additional blast furnace slag is added. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

Displacement

Conventional displacement techniques can be used to displace the drilling fluid with the cementitious slurry. However, because of the inherent compatibility of the drilling fluid and the cementitious slurry, wiper plugs and/or spacer fluids can be omitted. Thus, the cementitious slurry can be placed in direct fluid contact with the drilling fluid and the drilling fluid displaced out of the annulus between a pipe being cemented and a surrounding wall. The cement is, in turn, displaced into the annulus by direct fluid contact with a displacement fluid such as seawater.

Generally, this involves introducing a cementitious slurry into a casing or liner followed by the displacement fluid and displacing the cementitious slurry down the casing or liner and back up into the annulus surrounding the casing or liner.

EXAMPLES

Example 1

Low grade blast furnace slag having a generally pelletized form was used in this Example. The partially pelletized form resulted from quenching with air and water as opposed to just air quenching or quick water quenching using just water. The slag was mixed with distilled water using 2 parts by weight of slag and 1 part by weight of water. The slurry was allowed to set at 100° F. and compared to a high grade blast furnace slag sold under the tradename "WELL-CEM" by Koch Minerals, Wichita, Kans. The results are shown in FIG. 1.

Example 2

Figure 2:
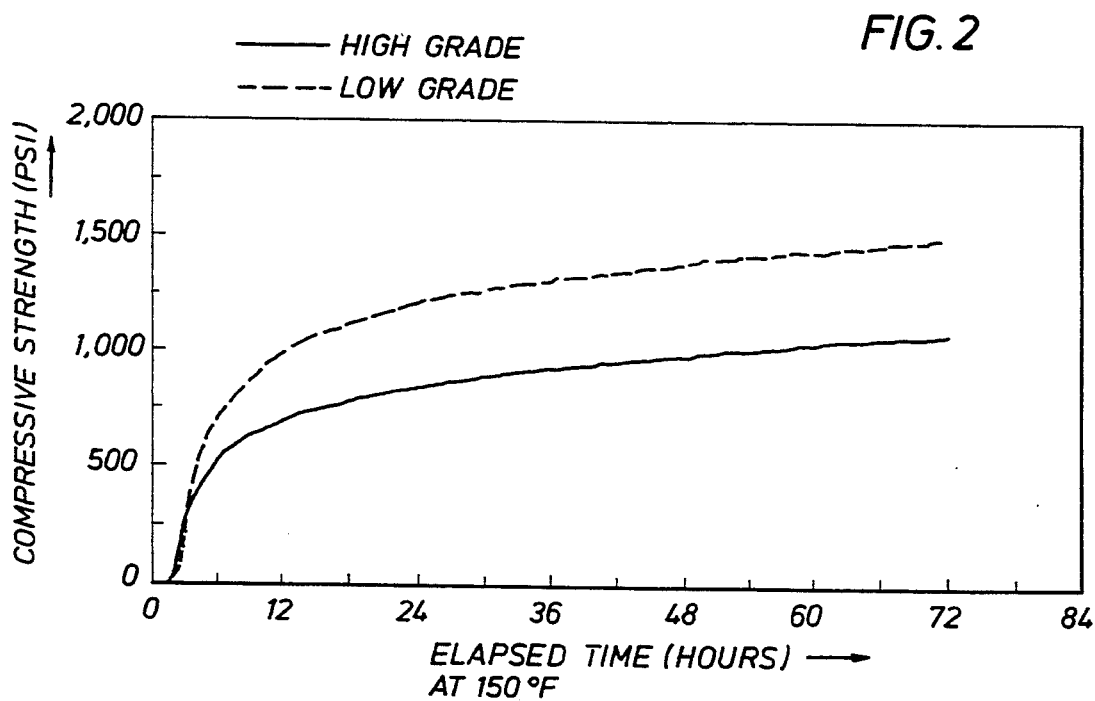

An additional amount of the same low grade blast furnace slag was used to prepare a similar slurry to that of Example 1. It was allowed to set at 150° F. For comparison, a slurry was made from grade 120 blast furnace slag, sold under the tradename "NEWCEM" by the Blue Circle Cement Company. The results are shown in FIG. 2. As can be seen, the low grade blast furnace slag exhibits the potential for strength that is greater than that of high grade. In light of the compatibility of blast furnace slag with drilling fluid, the composition of this invention offers a low cost, high quality cement suitable for high temperature well cementing operations using drilling fluid as part of the cement.

While this invention has been described in detail for the purpose of illustration, it is not to be construed as limited thereby but is intended to cover all changes and modifications within the spirit and scope thereof.

What is claimed is:

1. A method of drilling and cementing comprising:
    drilling a borehole with a drill string utilizing a drilling fluid, thus producing a used drilling fluid;
    removing said drill string and disposing a pipe within said borehole, a portion of said used drilling fluid being disposed in said pipe and in an annulus surrounding said pipe;
    combining ingredients comprising blast furnace slag having a slag activity index of less than 100 and water to produce a cementitious slurry;
    introducing said cementitious slurry into said pipe; and
    displacing said cementitious slurry into said annulus wherein said cementitious slurry encounters a temperature in the range of 150°–250° F.

2. A method of drilling and cementing comprising:
    drilling a borehole with a drill string utilizing a drilling fluid, thus producing a used drilling fluid;
    removing said drill string and disposing a pipe within said borehole, a portion of said used drilling fluid being disposed in said pipe and in an annulus surrounding said pipe;
    combining ingredients comprising blast furnace slag having a slag activity index of less than 100 and water to produce a cementitious slurry;

introducing said cementitious slurry into said pipe; and displacing said cementitious slurry into said annulus wherein said cementitious slurry encounters a temperature within the range of 150°–700° F. and wherein said blast furnace slag has a particle size such that it exhibits a Blaine specific surface area within the range of 4000–9000 cm$^2$/g.

3. A method of drilling and cementing comprising:

drilling a borehole with a drill string utilizing a drilling fluid, thus producing a used drilling fluid;

removing said drill string and disposing a pipe within said borehole, a portion of said used drilling fluid being disposed in said pipe and in an annulus surrounding said pipe;

combining ingredients comprising blast furnace slag having a slag activity index of less than 100 and water to produce a cementitious slurry;

introducing said cementitious slurry into said pipe; and displacing said cementitious slurry into said annulus wherein said cementitious slurry encounters a temperature of greater than 250° F.

* * * * *